United States Patent [19]

Maeda

[11] Patent Number: 4,723,185
[45] Date of Patent: Feb. 2, 1988

[54] RECORDING AND/OR REPRODUCING APPARATUS

[75] Inventor: Masaya Maeda, Kanagawa, Japan

[73] Assignee: Canon Kabushiki Kaisha, Tokyo, Japan

[21] Appl. No.: 651,668

[22] Filed: Sep. 17, 1984

[30] Foreign Application Priority Data

Sep. 17, 1983 [JP] Japan .................. 58-171477
Sep. 17, 1983 [JP] Japan .................. 58-171478

[51] Int. Cl.⁴ .......... G11B 5/012; G11B 15/675; G11B 17/035; G11B 5/55
[52] U.S. Cl. .......... 360/97; 360/71; 360/93; 360/96.5; 360/106; 369/77.2; 369/221
[58] Field of Search .......... 360/86, 97-99, 360/133, 93, 96.5, 69, 71, 75, 105, 106; 369/75.2, 77.1, 77.2, 215, 219, 220, 223

[56] References Cited

U.S. PATENT DOCUMENTS

| | | | |
|---|---|---|---|
| 4,337,487 | 6/1982 | Takai | 360/71 |
| 4,466,033 | 8/1984 | Jordan et al. | 360/99 |
| 4,481,618 | 11/1984 | Nakayama | 369/75.2 X |
| 4,507,769 | 3/1985 | Fukumitsu et al. | 369/77.2 |
| 4,507,771 | 3/1985 | Tanaka | 369/77.2 |
| 4,586,096 | 4/1986 | Okada | 360/96.5 |

FOREIGN PATENT DOCUMENTS 58-14374  1/1983  Japan .................. 360/97

Primary Examiner—A. J. Heinz
Assistant Examiner—Benjamin E. Urcia
Attorney, Agent, or Firm—Toren, McGeady & Associates

[57] ABSTRACT

A recording and/or reproducing apparatus using a magnetic disc housed in a cassette, in which the cassette is received and placed by a cassette holder at a predetermined loading position for the signal recording and/or reproduction where a magnetic head is provided. The head is moved relative to the disc by a head moving mechanism driven by a motor, while the holder is moved by a loading mechanism which is selectively connectible with the motor through a clutch mechanism. Thus, the head moving motor is also utilized as a cassette loading motor.

8 Claims, 7 Drawing Figures

RECORDING AND/OR REPRODUCING APPARATUS

BACKGROUND OF THE INVENTION

1. Field of the Invention

This invention relates to a recording and/or reproducing apparatus and more particularly to an apparatus which uses a record bearing medium such as a magnetic recording disc or drum and has shifting means for shifting the recording or reproducing position of a recording and/or reproducing head relative to the record bearing medium.

2. Description of the Prior Art

For a recording and/or reproducing apparatus of the kind which records information on a rotating disc-shaped record bearing medium such as a magnetic recording disc in the form of helical or concentrical recording tracks and/or reproduces the recorded information from the medium, it is important to accurately and reliably load the record bearing medium at a predetermined position by simple means. Heretofore, the apparatus of this kind has been loaded with the record bearing medium by means of a motor which is arranged solely for that purpose. However, the provision of such driving means solely for the loading purpose results in a complicated structural arrangement and thus hinders reduction in size and cost of the apparatus.

SUMMARY OF THE INVENTION

It is therefore a principal object of the present invention to provide a novel recording and/or reproducing apparatus which is capable of obviating the prior inconvenience encountered with the apparatus of the above-stated kind. More specifically, it is principal object of this invention to provide a recording and/or reproducing apparatus which is capable of loading the record bearing medium in a predetermined signal recording or reproducing position arranged within the apparatus without recourse to any additional drive means heretofore used solely for the record bearing medium loading purpose.

It is another object of this invention to be attained together with the above-stated object, to provide a recording and/or reproducing apparatus, wherein a drive source which is provided for a head moving mechanism arranged to shift the recording or reproducing position of a recording and/or reproducing head relative to the record bearing medium is advantageously utilized also for loading the record bearing medium in the above-stated predetermined position.

Under these objects, according to an aspect of the present invention, a recording and/or reproducing apparatus comprises a holder movable between a first position for receiving a record bearing medium and a second position for placing the received medium at a predetermined loading position for the signal recording and/or reproduction, a recording and/or reproducing head, a head moving mechanism for moving the head to change the recording or reproducing position on the medium, a driving source for the head moving mechanism, a loading mechanism for moving the holder between its first and second positions, and clutch means for selectively connecting the loading mechanism with the driving source.

In the recording and/or reproducing apparatus embodying the above-stated aspect of the invention, the output of the drive or driving source for the head moving mechanism is arranged to be selectively switched by the clutch means to be used for driving the record bearing medium loading mechanism. This arrangement dispenses with another drive source which is otherwise required for the sole purpose of loading the record bearing medium. After completion of loading, the drive source is disconnected from the loading mechanism. Therefore, the head can be accurately shifted from one position to another at the recording or reproduction.

It is a further object of the invention to provide a recording and/or reproducing apparatus wherein a record bearing medium loading mechanism is simplified to permit loading and unloading operations with a drive source rotated in the same direction; and a record bearing medium ejecting mechanism is also simplified.

Under this object, according to the other aspect of the present invention, a recording and/or reproducing apparatus comprises recording and/or reproducing means, a loading mechanism for loading a record bearing medium on and unloading the medium from the recording and/or reproducing means, a uni-directional driving source, clutch means for selectively causing the loading mechanism to load and unload the medium relative to the recording and/or reproducing means by the driving force of the driving source, and ejection means operatively associated with the clutch means for ejecting the medium at the unloading thereof.

In this aspect of the invention, the loading and unloading operations on the record bearing medium can be accomplished with the drive source being allowed to rotate in the same rotating direction by shifting the clutch means and the ejecting means is arranged to eject the record bearing medium in operative association with the clutch means. This arrangement permits simplification of the structural arrangement of the drive source and the control circuit thereof and permits the medium loading, unloading and ejecting operations with a simple mechanism.

The above and other objects and features of the invention will become apparent from the following detailed description of a preferred embodiment thereof taken in connection with the accompanying drawings.

BRIEF DESCRIPTION OF THE DRAWINGS

The preferred embodiment of the invention is arranged as shown in the accompanying drawings in which.

DETAILED DESCRIPTION OF THE PREFERRED EMBODIMENTS

Figure 1:
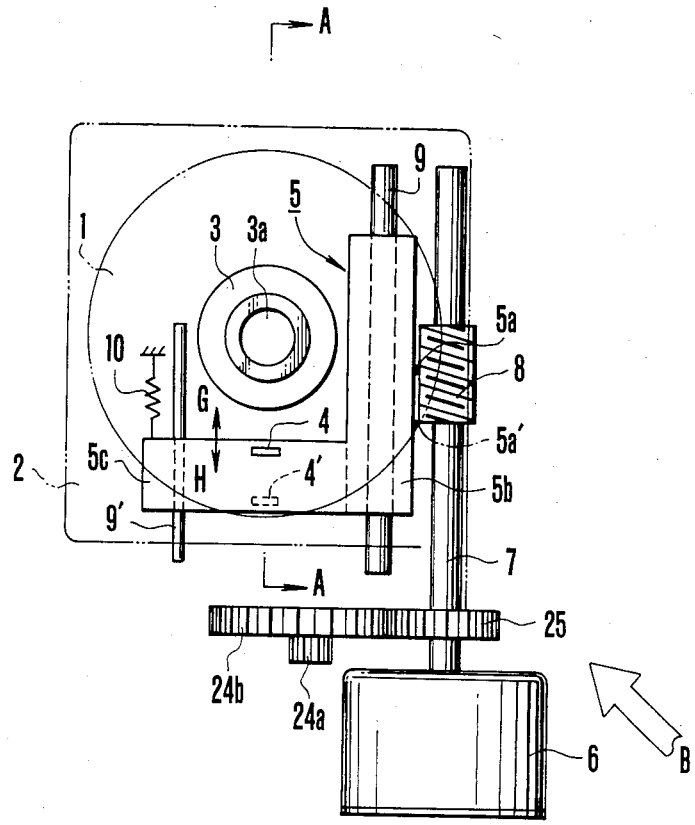
FIG. 1 is a plan view showing a head moving mechanism arranged in the embodiment of the invention.
Figure 2:
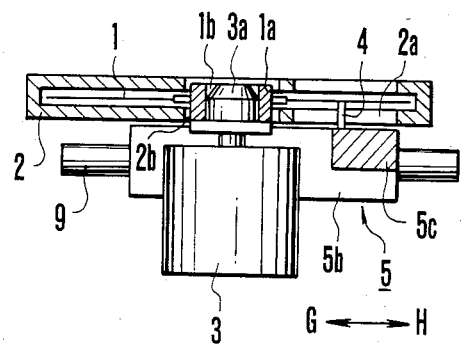
FIG. 2 is a sectional view taken on a line A—A of FIG. 1.

Referring to FIGS. 1 and 2, a head moving mechanism of the embodiment will be described. The illustrations of these drawings include a flexible magnetic disc 1 which is employed by way of an example of a record bearing medium; a cassette 2 which is arranged to house the record bearing medium; and a motor 3 which is arranged to drive the record bearing medium or disc 1 to rotate. A center hub 1a is arranged in the middle part of the magnetic disc 1. The center hub 1a is provided with a center hole 1b to be mounted at this hole 1b on a spindle 3a which is attached to the fore end of the output shaft of the disc driving motor 3. The cassette 2 is in a thin box-like shape and is provided with an opening 2a which is arranged to allow a recording or reproducing head 4, such as a magnetic head, to come into the cassette 2 and another opening 2b which is formed in a place corresponding to the center hub 1a of the disc 1. In loading the cassette 2, the center hub 1a is mounted on the spindle 3a. With the center hub 1a thus mounted, the magnetic disc 1 is rotated by the motor 3 at a predetermined rotational speed. The recording or reproducing head 4 is mounted on a head carrier 5 which is provided with an engaging part 5a. A head-moving and cassette-loading motor 6 which is, for example, a stepping motor, is arranged to drive a head moving mechanism and a cassette loading mechanism, as will later be described. A shaft 7 of a screw 8 is coaxial with the output shaft of the motor 6 and is arranged to rotate together with the output shaft. The screw 8 engages the engaging part 5a of the head carrier 5 and is arranged to move the head 4. A guide shaft 9 is arranged to guide the head carrier 5, which has the guide shaft 9 inserted into a hollow cylindrical part 5b thereof. Another guide shaft 9' is arranged to carry the arm part or head carrying part 5c of the head carrier 5 extending sidewise by supporting it from below.

With the embodiment arranged in this manner, the head carrier 5 moves in the direction of arrow G or H in FIG. 1 accordingly as the motor 6 rotates forwards or backwards. Then, the head 4 moves radially relative to the magnetic disc 1 to shift its recording or reproducing position. A coiled spring 10 has one end thereof secured to the chassis of the apparatus and the other end to a part of the head carrier 5. The head carrier 5 is thus urged by the spring 10 to move in the direction of arrow G in FIG. 1, so that backlash can be eliminated from the engagement between the engaging part 5a of the head carrier 5 and the screw 8. The illustration of FIG. 1 further includes a drive pinion 24a, a connecting gear 24b which is coaxial with the pinion 24a and a drive gear 25 which is arranged to engage the connecting gear 24b and to rotate together with the output shaft of the motor 6. The arrangement and operation of the pinion 24a and the gears 24b and 25 will be later described.

Figure 3:
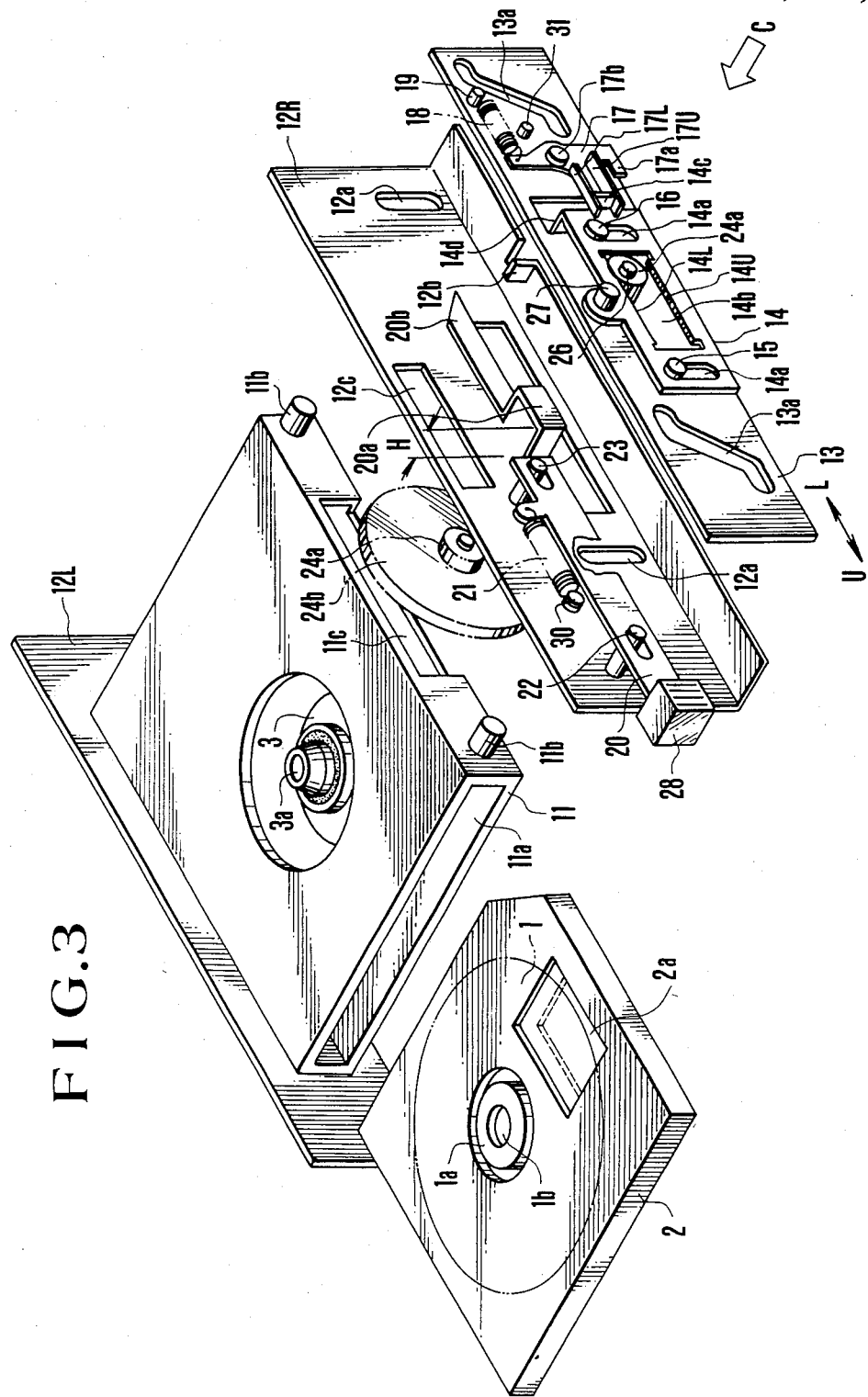
FIG. 3 is an exploded oblique view taken in the direction of arrow B of FIG. 1 showing a loading mechanism arranged in the embodiment of the invention.
Figure 4:
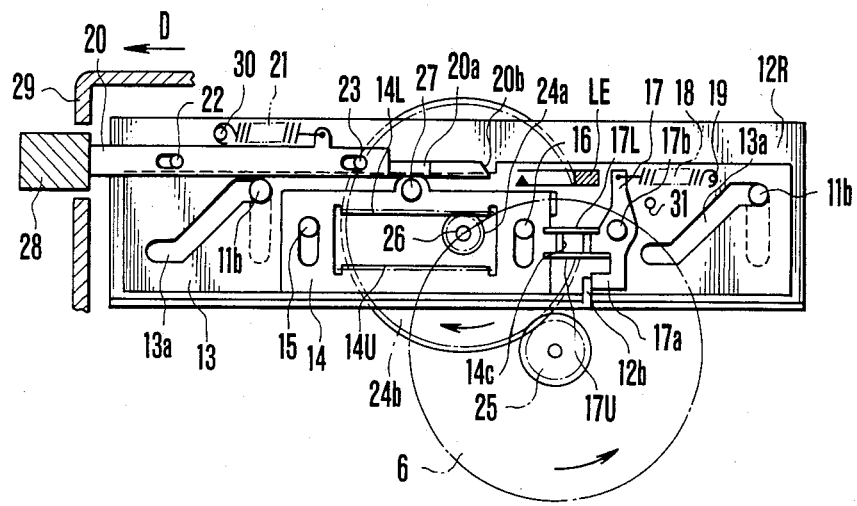
FIG. 4 is a side view taken in the direction of arrow C of FIG. 3 showing the loading mechanism shown in FIG. 3.

Referring to FIGS. 3 and 4, the cassette loading mechanism of the embodiment is arranged as follows: A cassette holder 11 is arranged to receive the cassette 2. In recording or reproduction, the holder 11 descends from its upper position relative to the spindle 3a as shown in FIG. 2 to a predetermined lower position. With the holder 11 descending to the lower position, the center hub 1a of the magnetic disc 1 is mounted on the spindle 3a at the center hole 1b thereof. Then, the head 4 closely confronts the disc 1 through the opening 2a of the cassette 2 when the cassette 2 is thus loaded. Right and left side plates 12R and 12L are secured to the chassis of the apparatus. A pair of sliders 13 are arranged to be slidable along these side plates 12R and 12L. In FIG. 3, only one of the sliders 13 is shown as arranged on the side of the side plate 12R. The cassette holder 11 is provided with a cassette inserting opening 11a, engaging pins 11b and an opening 11c. A total of four engaging pins 11b are arranged on two sides of the cassette holder 11, two of them being disposed on each of the two sides. A pair of slots 12a are formed in each of the two side plates 12R and 12L and are arranged to have the cassette holder 11 movably carried between these right and left side plates 12R and 12L with the engaging pins 11b engaged with these slots 12a respectively. The above-stated opening 11c is arranged to allow the bent part 14d of a clutch slider 14 which will be described later to come into the holder 11. The side plate 12R is provided also with a stopper 12b and an opening 12c besides the slots 12a. The stopper 12b is arranged to engage and stop the arm part 17a of a swing lever 17 which will be described later. The opening 12a is arranged to allow the above-stated bent part 14d of the clutch slider 14 to enter the opening 11c of the holder 11 through this opening 12c. The slider 13 is provided with a pair of cam slots 13a which are arranged to engage with the engaging pins 11b of the holder 11 projecting through the slots 12a of the side plate 12R respectively. When the slider 13 slides in the direction of arrow U or L in FIG. 3, the cassette holder 11 moves along the cam slots 13a of the slider 13 with the engaging pins 11b thereof being guided by the slots 12a of the side plate 12. Such being the arrangement, the cassette 2 which is inserted in the holder 11 moves downward when it is to be loaded and upward when it is to be unloaded.

The clutch slider 14 is shown as an example of clutch means that can be arranged in accordance with this invention. The clutch slider 14 has guide pins 15 and 16 of the slider 13 inserted into a pair of slots 14a provided therein. The clutch slider 14 is thus slidable up and down being guided by these slots 14a and guide pins 15 and 16. In other words, while the slider 13 is arranged to be slidable in the cassette inserting direction relative to the side plate 12R, the clutch slider 14 is arranged to be slidable over the slider 13 in the vertical direction perpendicularly to the sliding direction of the slider 13. The clutch slider 14 is further provided with an opening 14b, rack parts 14L and 14U which are arranged respectively on the upper and lower sides of the opening 14b, and front and rear bent parts 14c and 14d. These rack parts 14L and 14U and bent parts 14c and 14d will be described in detail later.

The swing lever 17 is formed with a resilient plate. The flexible arm parts 17L and 17U of the lever 17 are arranged to carry the bent part 14c of the clutch slider 14 between them. The swing lever 17 is pivotally carried by a shaft 17b which is provided on the slider 13 and is urged by the force of a coiled spring 18 to turn clockwise on this shaft 17b. This spring 18 is interposed between a part of the lever 17 and a spring peg 19 provided on the slider 13. Accordingly, the clutch slider 14 is constantly urged by the lever 17 to move upward. The embodiment further includes an eject slider 20, a coiled spring 21 which is disposed between a part of the eject slider 20 and the side plate 12R, and guide pins 22 and 23 which are provided on the side plate 12R. The eject slider 20 is movable as being guided by these guide pins 22 and 23 and is urged by the force of the coiled spring 21 to move in the direction of arrow D or leftward as viewed in FIG. 4.

The clutch slider driving pinion 24a is disposed within the opening 14b of the clutch slider 14. The pinion 24a is arranged to selectively engage the upper rack 14L or the lower rack 14U accordingly as the clutch slider 14 moves upward or downward or to say in, an intermediate position between the two racks 14L and 14U without engaging with any of them. The connecting gear 24b is formed coaxially and in one unified body with the pinion 24a (as mentioned in the foregoing) and is rotatably carried by a shaft 26 which is fixed to the chassis of the apparatus. The drive gear 25 is arranged coaxially and in one unified body with the output shaft of the motor 6 arranged to shift the head 4 and also to drive the cassette loading mechanism. The gear 25 is thus arranged to rotate together with the output shaft of the motor 6 and to drive the connecting gear 24b by engaging therewith.

A guide pin 27 is provided on the clutch slider 14. The height of the guide pin 27 is lower than that of the bent part 20a of the eject slider 20 as indicated by "H" in FIG. 3. However, the guide pin 27 is arranged to be capable of abutting on all parts of the eject slider 20 other than the bent part 20a. Referring to FIG. 4, an eject button 28 is provided at one end of the eject slider 20. A reference numeral 29 denotes a part of the casing of the apparatus. A stopper pin 31 is provided on the slider 13 to restrict the clockwise turn of the lever 17. A switch LE is arranged to detect completion of a cassette loading operation according to the position of the clutch slider 14.

Among the members described above, the side plates 12R and 12L, the sliders 13, the slots 12a and cam slots 13a are all arranged in pairs on the left and right sides of the holder 11. However, the stopper 12b and the opening 12c of the side plate 12R, the opening 11c of the holder 11, the clutch slider 14, the swing lever 17 and the eject slider 20 are arranged only on one side of the holder 11 or on the front side as viewed in FIG. 3. The slider 13 on the side of the side plate 12L is connected to the other slider 13 disposed on the side of the other side plate 12R by a connecting member (not shown) and is thus arranged to be movable together with the latter.

Figure 5:
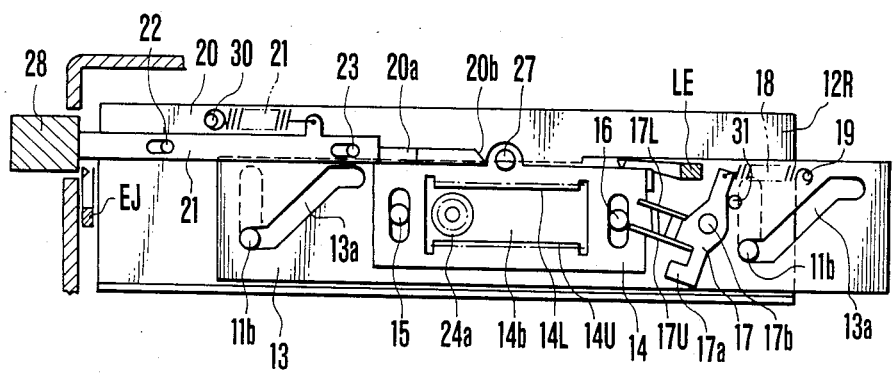
FIG. 5 is a side view showing the loading mechanism of FIG. 4 as in a state of having completed a loading operation.

FIG. 5 shows the cassette loading mechanism of FIG. 3 as in a state of having completed a loading operation with the clutch slider 14 moved up to an intermediate position by a clockwise turn of the lever 17. In this condition, neither of the upper and lower rack parts 14L and 14U of the clutch slider 14 engages the pinion 24. An eject switch EJ is arranged to be closed by a rightward sliding of the eject slider 20 as viewed on FIG. 5.

Figure 6:
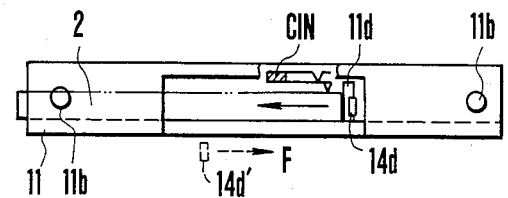
FIG. 6 is a side view of a cassette holder.

FIG. 6 shows the cassette holder 11 as viewed from the side of the opening 11c thereof. A cassette detecting switch CIN is arranged within the holder 11 to be closed by a part of the cassette 2 when the cassette 2 is inserted into the holder 11 until it reaches a position where a restricting part 11d of the holder 11 restricts further insertion. The bent part 14d of the clutch slider 14 is in a position 14d' as shown in FIG. 6 before cassette insertion. The bent part 14d moves in the direction of a broken line arrow F during the process of cassette loading and takes a position at the fore end part of the cassette 2 upon completion of loading. In unloading the cassette 2, the bent part 14d moves in the direction of a full line arrow E to eject the cassette 2 from the cassette holder 11 by pushing the fore end part of the cassette 2.

Cassette Loading Operation: With the apparatus arranged as described in the foregoing, it operates as follows: FIG. 4 shows the apparatus in a state of having no cassette inserted. Under this condition, the arm part 17a of the lever 17 abuts onto the stopper 12b formed on the side plate 12R. Accordingly, the clockwise turn of the lever 17 is prevented against the urging force of the spring 18. The clutch slider 14 is located in the lowest position thereof and thus has its upper rack part 14L engaging the pinion 24a. The guide pin 27 which is provided on the clutch slider 14 is located in a position corresponding to the bent part 20a of the eject slider 20 and at a height lower than that of the bent part 20a ("H" in FIG. 3).

With the cassette 2 inserted through the opening 11a into the cassette holder 11 until insertion is restricted at a predetermined point by the restricting part 11d under this condition, the cassette detecting switch CIN (FIG. 6) is closed to cause the motor 6 to rotate counterclockwise as viewed on FIG. 4. This causes the drive pinion 24a via the drive gear 25 and connecting gear 24b to rotate clockwise. Since the upper rack 14L of the clutch slider 14 is engaging the drive pinion 24a under this condition, the rotation of the pinion 24a causes the clutch slider 14 and, accordingly, the slider 13 to slide rightward as viewed on FIG. 4. The sliding movement of the slider 13 disengages the lever 17 from the stopper 12b. Therefore, the clutch slider 14 is urged to move upward by the force of the spring 18 and the lever 17. At this time, however, the guide pin 27 engages the lower end of the eject slider 20 to keep the rack part 14L of the slider 14 engaged with the pinion 24a.

The rightward sliding movement of the slider 13 causes the engaging pins 11b of the holder 11 to be guided by the cam slots 13a of the slider 13 and to move downward along the slots 12a provided in the side plates 12R and 12L. With the holder 11 thus moved downward, the cassette 2 is moved to a predetermined loading position. When the slider 13 comes to a position where the guide pin 27 disengages from the eject slider 20, the lever 17 is caused by the coiled spring 18 to turn clockwise until it abuts on the stopper pin 31 provided on the slider 13. As a result, the clutch slider 14 is moved upward through the bent part 14c which is sandwiched in between the flexible arm parts 17L and 17U of the lever 17. Then, the drive pinion 24a is set in the intermediate position where it engages neither the rack part 14L nor the rack parts 14U of the clutch slider 14. With the clutch slider 14 thus moving upward, the loading completion detecting switch LE which is arranged at the slider 13 is closed to stop the motor 6. Under the condition of having completed the cassette loading operation as shown in FIG. 5, the engaging pins 11b of the cassette holder 11 are at the lowest position in the cam slots 13a formed in the slider 13.

Head Moving Operation: In the case of the cassette loading operation mentioned above, the head-moving and cassette-loading motor 6 continuously rotates counterclockwise as viewed on FIG. 4. During this motor rotation, the head carrier 5 moves in the direction of arrow H as shown in FIG. 1 while the head 4 and the engaging part 5a of the carrier 5 respectively move to positions 4' and 5' as shown also in FIG. 1. Under this condition, the engaging part 5a is located at the end part of the screw 8. Therefore, the loading operation proceeds with the motor 6 further rotating despite that the move of the head carrier 5 in the direction of arrow H has become no longer possible. At that moment, the head 4 is located at a stand-by position outside a predetermined recording area on the magnetic disc 1. Therefore, the head can be readily shifted for a recording or reproducing operation without difficulty. The details of this relation are as follows:

The extent to which the motor 6 is to be rotated during a period between the start of cassette loading or unloading and the end thereof is arranged to be more than a rotating extent required for shifting the head 4 from a position corresponding to the innermost recording track (the 50th track, for example) within the predetermined recording area on the magnetic disc 1 to a position located further outside than a position corresponding to the outermost track (the first track, for example). After the head 4 reaches the above-stated stand-by position, the engaging part 5a of the head carrier 5 disengages from the screw 8 and is kept by the force of the spring 10 in a state of abutting onto the end face of the screw 8 while the motor 6 further rotates. Therefore, the head 4 is kept in that stand-by position. Of course, the stand-by position of the head 4 may be arranged to be at a position outside the predetermined recording area on the inner side thereof.

After the head 4 is set in the stand-by position, when the motor 6 is rotated forward, or in the direction of moving the head 4 toward the center of the magnetic disc 1, the force of the spring 10 causes the engaging part 5a to again engage with the screw 8 to permit the head 4 to be shifted. In performing a recording or reproducing operation, the screw 8 rotates forward or backward according as the motor 6 rotates forward or backward. The recording and or reproducing head 4 is then shifted forward or backward in the radial direction of the magnetic disc 1, or in the direction of arrow G or H, through the engagement between the engaging part 5a of the head carrier 5 and the screw 8. At this time, since the drive pinion 24a has been engaging neither of the upper and lower rack parts 14L and 14U of the clutch slider 14 after completion of cassette loading, the head 4 can be shifted without hindrance.

Cassette Unloading Operation: Referring to FIG. 5, the eject slider 20 moves to the right when the eject button 28 is pushed. The eject switch EJ is then closed. With the switch EJ closed, the motor 6 again rotates in the same direction as in the case of cassette loading, i.e. counterclockwise as viewed on FIG. 4. This causes the drive pinion 24a to rotate clockwise. Further, with the eject slider 20 moving to the right, the guide pin 27 engages with a slanting part 20b of the slider 20 to cause thereby the clutch slider 14 to move further upward from the position thereof shown in FIG. 5. In this instance, the upper flexible arm part 17L of the lever 17 is arranged to be deformable within its elastic limit.

When further moved upward, the clutch slider 14 engages at the lower rack part 14U thereof with the pinion 24a. Therefore, the slider 13 moves in the direction of arrow D, i.e. to the left as viewed on FIG. 5, accordingly as the pinion 24a rotates clockwise. As a result of this, the cassette holder 11 moves upward through the processes reverse to those of the above-stated loading operation. With the slider 13 moved to the left, the arm part 17a of the lever 17 abuts onto the stopper 12b of the side plate 12R immediately before the guide pin 27 comes to the bent part 20a of the eject slider 20. Then, the leVer 17 is turned counterclockwise against the tensile force of the spring 18. The flexible arm part 17L of the lever 17 then urges the clutch slider 14 to move downward. After that, when the guide pin 27 comes to the bent part 20a of the eject slider 20, the urging force of the upper flexible arm part 17L of the lever 17 causes the guide pin 27 to pass through the bent part 20a. This allows the clutch slider 14 to move down to have the upper rack part 14L again engage with the pinion 24a. The downward movement of the clutch slider 14 opens the switch LE to stop the motor 6. The apparatus then comes back to the initial state as shown in FIG. 4.

In the above-stated cassette unloading operation, the cassette 2 is ejected in the following manner: FIG. 6 is to show this cassette ejecting action. As mentioned in the foregoing, the bent part 14d of the clutch slider 14 is inserted into the cassette holder 11 through the opening 11c thereof and the opening 12c of the side plate 12R. Before the cassette 2 is inserted, the bent part 14d is located in the position 14d' as indicated by a broken line in FIG. 6. During the cassette loading operation, the bent part 14d moves in the direction of a broken line arrow F of FIG. 6 to be located at the fore end part of the cassette 2 as indicated by a full line 14d upon completion of cassette loading. In unloading the cassette 2, the bent part 14d moves in the direction of a full line arrow E of FIG. 6 to eject the cassette 2 from the holder 11 by pushing the fore end part of the cassette 2. In other words, the bent part 14d which is formed in one unified body with the clutch lever 14, is arranged to move in the loading direction below the cassette 2 during the loading operation and to move in the ejecting direction at the same height as the cassette 2 during the unloading operation.

Figure 7:
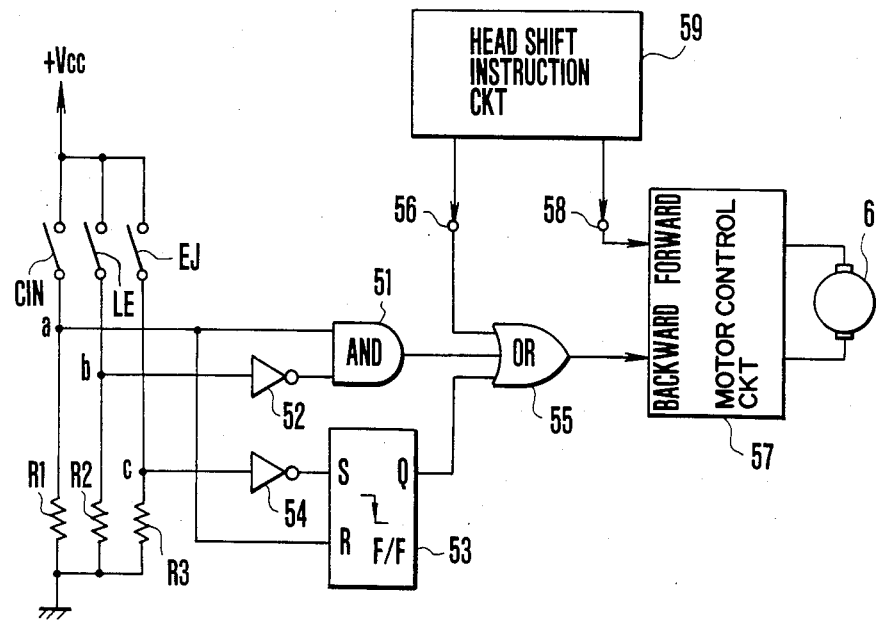
FIG. 7 is a block diagram showing a control circuit for to be used for head shifting and cassette loading operation.

FIG. 7 shows a control circuit suited for the above-stated operation of the head-moving and cassette-loading motor 6. The control circuit includes the above-stated normal open type switches CIN, LE and EJ which are provided for cassette detection, loading completion detection and cassette ejection. These switches are respectively connected in series with resistors R1, R2 and R3 between an electric power source +Vcc and a circuit ground. An AND circuit 51 is arranged to haVe a signal or potential at a connection point "a" between the switch CIN and the resistor R1 supplied to one of the input terminals thereof and to have a signal or potential at a connection point "b" between the switch LE and the resistor R2 supplied to the other input terminal through an inverter 52. A fall edge synchronizing type RS flip-flop 53 is arranged to have a signal or potential at a connection point "c" between the switch EJ and the resistor R3 supplied to the set input terminal S thereof through an inverter 54 and the signal of the above-stated point "a" supplied to the reset input terminal R thereof. Thereby the flip-flop 53 is set by a change of the output level of the inverter 54 from a high leVel to a low level and reset by a change of the potential at the point "a" from a high level to a low level. An OR circuit 55 is arranged to receive the output of the AND circuit 51, the Q output of the flip-flop 53 and a backward or reverse rotation instruction signal which will be described later from an input terminal 56. A motor driving circuit 57 is arranged to receive a forward rotation instruction signal which will be described later from another input terminal 58 and the output of the OR circuit 55. The motor driving circuit causes the motor 6 to rotate forward or backward according to these signals. The term "the forward rotation" of the motor 6 as used herein for the purpose of this embodiment means the rotating direction in which the motor 6 causes the recording or reproducing head 4 to be shifted from the outer peripheral part of the magnetic disc 1 toward the center thereof. The term "the backward rotation" means the rotating direction in which the motor 6 causes the head 4 to be shifted from the center or inner part of the disc 1 toward the outer periphery thereof. A head shift instruction circuit 59 is arranged to give the forward rotation instruction signal and the backward rotation instruction signal to the input terminals 58 and 56 respectively.

The operation of the circuit shown in FIG. 7 is as follows: The switch CIN is closed by insertion of the cassette 2 into the cassette holder 11 to the predetermined position (FIG. 6). With the switch CIN thus closed, the level of the potential at the point "a" becomes high. On the other hand, the potential at the point "b" is at a low level as the switch LE is open. The output of the inverter 52 is therefore at a high level and, accordingly, that of the OR circuit 55 becomes also a high level. In response to the high level output of the OR circuit 55, the motor driving circuit 57 causes the motor 6 to rotate backward. This in turn causes the drive gear 25 (FIG. 4) to turn counterclockwise. The drive pinion 24a, therefore, turns clockwise to have the cassette 2 loaded by the loading operation described in the foregoing.

Upon completion of cassette loading, the eject slider 14 moves upward to close the switch LE. The level of potential at the point "b" then becomes high and that of the output of the inverter 52 low to make the output level of the AND circuit 51 low. The output level of the OR circuit 55, therefore, becomes low to have the motor driving circuit 57 stop the motor 6 in response to the low level output. At that moment, the flip-flop 53 is in a state of having been reset, for example, by means of a power-up-clear circuit and, therefore, has its Q output at a low level.

In unloading the cassette 2, the switch EJ is closed when the eject button 28 is pushed. With the switch EJ closed, the potential at the point "c" changes from a low level to a high level. Accordingly, the output level of the inverter 54 changes from a high level to a low level. The flip-flop 53 is set by this. The level of the Q output of the flip-flop 53 thus becomes high to make the output level of the OR circuit 55 high. In response to the high level output of the OR circuit 55, the motor driving circuit 57 causes the motor 6 again to rotate backward. Under this condition, the slider 13 slides to the left because the rack part 14U of the clutch slider 14 is engaging the drive pinion 24a. As a result, the cassette 2 is unloaded and the ejecting action is performed thereon in the manner as described in the foregoing. In this case, even when the switch EJ opens, the RS flip-flop 53 remains in the set state until the switch CIN opens. Therefore, even after the eject button 28 is released from a pushing operation performed thereon, the above-stated operation proceeds as described. However, the eject button 28 must remain in a pushed position until the guide pin 27 rides on the eject slider 20.

When the switch CIN opens with the cassette 2 having been ejected from the holder 11 by the bent part 14d of the clutch slider 14, the potential at the point "a" changes from a high level to a low level. The flip-flop 53 is reset and the output level of the OR circuit 55 becomes low. The motor driving circuit 57 stops the motor 6.

The input terminals 58 and 56 are arranged to receive the forward rotation and backward rotation instruction signals from the head shift instruction circuit 59 for shifting the head 4 back and forth during recording and reproducing operations. With the forward rotation instruction signal supplied to the terminal 58, the motor driving circuit 57 causes the motor 6 to rotate forward. Then, the head 4 is shifted by the forward rotation of the motor from a peripheral part of the magnetic disc 1 toward the center thereof through the screw 8 and the engaging part 5a of the head carrier 5. When the backward rotation instruction signal is supplied to the other terminal 56, the signal is applied to the motor driving circuit 57 through the OR circuit 55 to cause the motor 6 to be rotated backward by the circuit 57. In that case, the head 4 is shifted from an inner part of the magnetic disc 1 toward the outer periphery of the disc 1.

In the case of the embodiment given in the foregoing, the invention is applied to a recording and/or reproducing apparatus of the type using a flexible magnetic disc as a record bearing medium. However, the invention is of course not limited to such application but is also applicable to the apparatuses of a wide range of different types. The application of the invention is advantageous particularly for recording and/or reproducing apparatuses of the kind wherein the recording and/or reproducing head is arranged to be shifted relative to a record bearing medium.

What is claimed is:

1. A recording and/or reproducing apparatus comprising:
    a holder movable between a first position for receiving a record bearing medium and a second position for placing the received medium at a predetermined loading position;
    a recording and/or reproducing head;
    a head moving mechanism for moving said head relative to the medium to change the recording or reproducing position on the medium;
    a drive source for said head moving mechanism;
    a loading mechanism for moving said holder between said first and second positions; and
    clutch means for selectively connecting said loading mechanism with said driving source;
    said loading mechanism including at least one movable member which is movable in a first direction for moving said holder from said first to said second positions and in a second direction, opposite to said first direction, for moving the holder from said second to said first positions, said clutch means being arranged to selectively connect said movable member with said driving source;
    said clutch means including a pinion gear connected with said driving source, a rack member operatively connected with said movable member in said loading mechanism, said rack member having a first and a second rack portions and being arranged to move the movable member in said first direction when engaged with said pinion gear at said first rack portion and to move the movable member in said second direction when engaged with the pinion gear at said second rack portion, and control means for engaging said rack member with said pinion gear at said first and second rack portions selectively and for retaining the rack member at a disengaged condition relative to the pinion gear.

2. The apparatus according to claim 1, wherein said driving source includes:
    an electrical motor; and
    a control circuit for said motor, said control circuit being arranged to cause said motor to rotate in a predetermined direction for moving said movable member in said loading mechanism between said first and second positions through said clutch means, said pinion gear in said clutch means and said head moving mechanism being connected with said motor.

3. The apparatus according to claim 2, wherein said head moving mechanism includes:
a screw member connected with said motor;
a head carrier for carrying said head, said carrier having an engaging portion engaged with said screw member; and
guide means for linearly guiding said head carrier.

4. The apparatus according to claim 3, wherein said motor is of step drive type.

5. A recording and/or reproducing apparatus using a disc-shaped record bearing medium housed in a container which is provided with an opening, said apparatus comprising:
a holder movable between a first position for receiving the container and a second position for placing the received container at a predetermined loading position;
a recording and/or reproducing head arranged to face with the medium through the opening of the container placed at said predetermined loading position;
rotating means for rotating the medium relative to said head;
a head moving mechanism for moving said head relative to the medium to change the recording or reproducing position on the medium;
a driving source for said head moving mechanism;
a loading mechanism for movign said holder between said first and second positions; and
clutch means for selectively connecting said loading mechanism with said driving source;
said loading mechanism including at least one movable member which is movable in a first direction for moving said holder from said first to said second positions and in a second direction, opposite to said first direction, for moving the holder from said second to said first positions, said clutch means being arranged to selectively connect said movable member with said driving source,
said clutch means including a pinion gear connected with said driving source, a rack member operatively connected with said movable member in said loading mechanism, said rack member having a first and a second rack portions and being arranged to move the movable member in said first direction when engaged with said pinion gear at said first rack portion and to move the movable member in said second direction when engaged with the pinion gear at said second rack portion, and control means for engaging said rack member with said pinion gear at said first and second rack portions selectively and for retaining the rack member at a disengaged condition relative to the pinion gear.

6. The apparatus according to claim 5, wherein said driving source includes:
an electrical motor; and
a control circuit for said motor, said control circuit being arranged to cause said motor to rotate in a predetermined direction for moving said movable member in said loading mechanism between said first and second positions through said clutch means,
said pinion gear in said clutch means and said head moving mechanism being connected with said motor.

7. The apparatus according to claim 6, wherein said head moving mechanism includes:
a screw member connected with said motor;
a head carrier for carrying said head, said carrier having an engaging portion engaged with said screw member; and
guide means for linearly guiding said head carrier.

8. The apparatus according to claim 7, wherein said motor is of step drive type.

* * * * *